United States Patent
Isaacs et al.

(10) Patent No.: US 9,626,523 B2
(45) Date of Patent: Apr. 18, 2017

(54) SYSTEMS AND METHODS OF AUDIT TRAILING OF DATA INCORPORATION

(71) Applicant: salesforce.com, inc., San Francisco, CA (US)

(72) Inventors: Charlie Isaacs, San Jose, CA (US); Antony Passemard, San Francisco, CA (US); Harish Peri, San Francisco, CA (US); Seema Kumar, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/145,735

(22) Filed: Dec. 31, 2013

(65) Prior Publication Data

US 2014/0115004 A1   Apr. 24, 2014

Related U.S. Application Data

(63) Continuation-in-part of application No. 13/791,295, filed on Mar. 8, 2013.

(60) Provisional application No. 61/608,423, filed on Mar. 8, 2012, provisional application No. 61/807,877, filed on Apr. 3, 2013, provisional application No. 61/807,892, filed on Apr. 3, 2013.

(51) Int. Cl.
*H04L 29/06* (2006.01)
*G06F 21/62* (2013.01)
*H04L 29/08* (2006.01)

(52) U.S. Cl.
CPC ............. *G06F 21/62* (2013.01); *H04L 63/10* (2013.01); *H04L 63/102* (2013.01); *H04L 63/20* (2013.01); *H04L 67/306* (2013.01)

(58) Field of Classification Search
CPC ................................ H04L 63/10; G06F 21/62
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Jason C Chiang
(74) *Attorney, Agent, or Firm* — Haynes Beffel & Wolfeld LLP; Ernest J. Beffel, Jr.

(57) ABSTRACT

The technology disclosed relates to creating an audit trail of data incorporation in user profiles. In particular, it relates to linking trust objects to fields of the user profiles.

The technology disclosed also relates to maintaining an opt trail that captures user opt-ins by recording the circumstances surrounding opt-in actions. In particular, it relates to linking trust objects to user profiles that connect users to an advertising campaign.

The technology disclosed further relates to tracking and measuring reputation of product models in consumer markets. In particular, it relates to assembling consumer feedback on the product models from online social networks and service records of the product models and applying sentiment analysis on the consumer feedback.

14 Claims, 13 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,697,824 B1 * | 2/2004 | Bowman-Amuah ......... 709/229 |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0220103 A1 * | 9/2007 | Rogers et al. ................. 709/217 |
| 2007/0261116 A1 * | 11/2007 | Prafullchandra et al. ...... 726/22 |
| 2008/0103879 A1 * | 5/2008 | Armstrong ............. G06Q 30/02 705/7.34 |
| 2008/0162496 A1 * | 7/2008 | Postrel ........................... 707/10 |
| 2008/0249972 A1 | 10/2008 | Dillon |
| 2009/0063415 A1 | 3/2009 | Chatfield et al. |
| 2009/0063619 A1 * | 3/2009 | Chijiiwa ............. G06F 17/3089 709/203 |
| 2009/0100342 A1 | 4/2009 | Jakobson |
| 2009/0132395 A1 * | 5/2009 | Lam et al. ...................... 705/30 |
| 2009/0177744 A1 | 7/2009 | Marlow et al. |
| 2010/0088313 A1 * | 4/2010 | Hoffman et al. ............. 707/733 |
| 2011/0113022 A1 * | 5/2011 | Polychronidis ............... 707/705 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233103 A1 * | 9/2012 | Ashrafi ........................... 706/16 |
| 2012/0233137 A1 | 9/2012 | Jakobson et al. |

(56) References Cited

U.S. PATENT DOCUMENTS

| | | |
|---|---|---|
| 2012/0290407 A1 | 11/2012 | Hubbard et al. |
| 2013/0044130 A1* | 2/2013 | Geisner et al. .............. 345/633 |
| 2013/0212497 A1 | 8/2013 | Zelenko et al. |
| 2013/0239170 A1 | 9/2013 | Ziemann et al. |
| 2013/0247216 A1 | 9/2013 | Cinarkaya et al. |

* cited by examiner

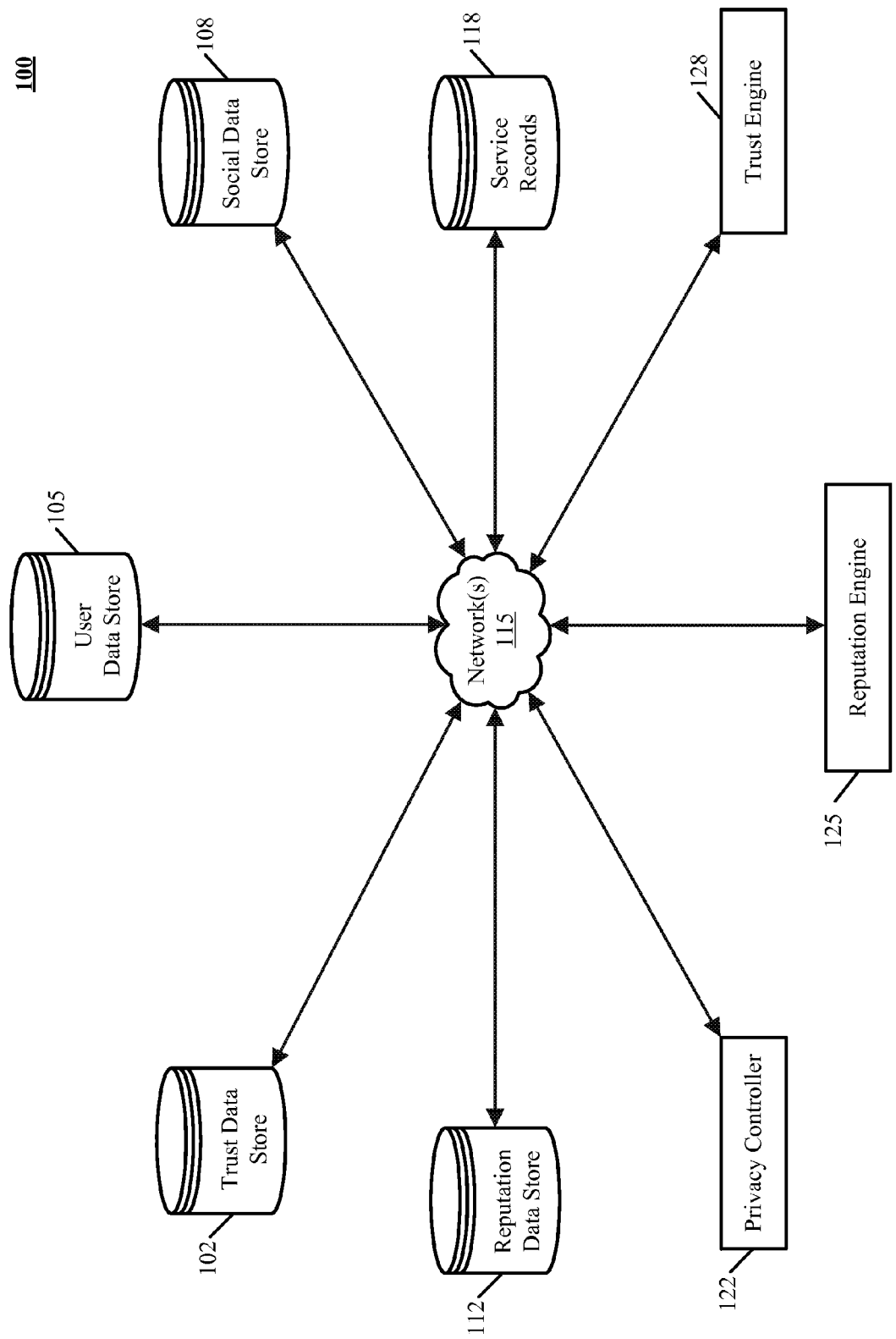
FIG. 1 – Servers, Clients, and Databases

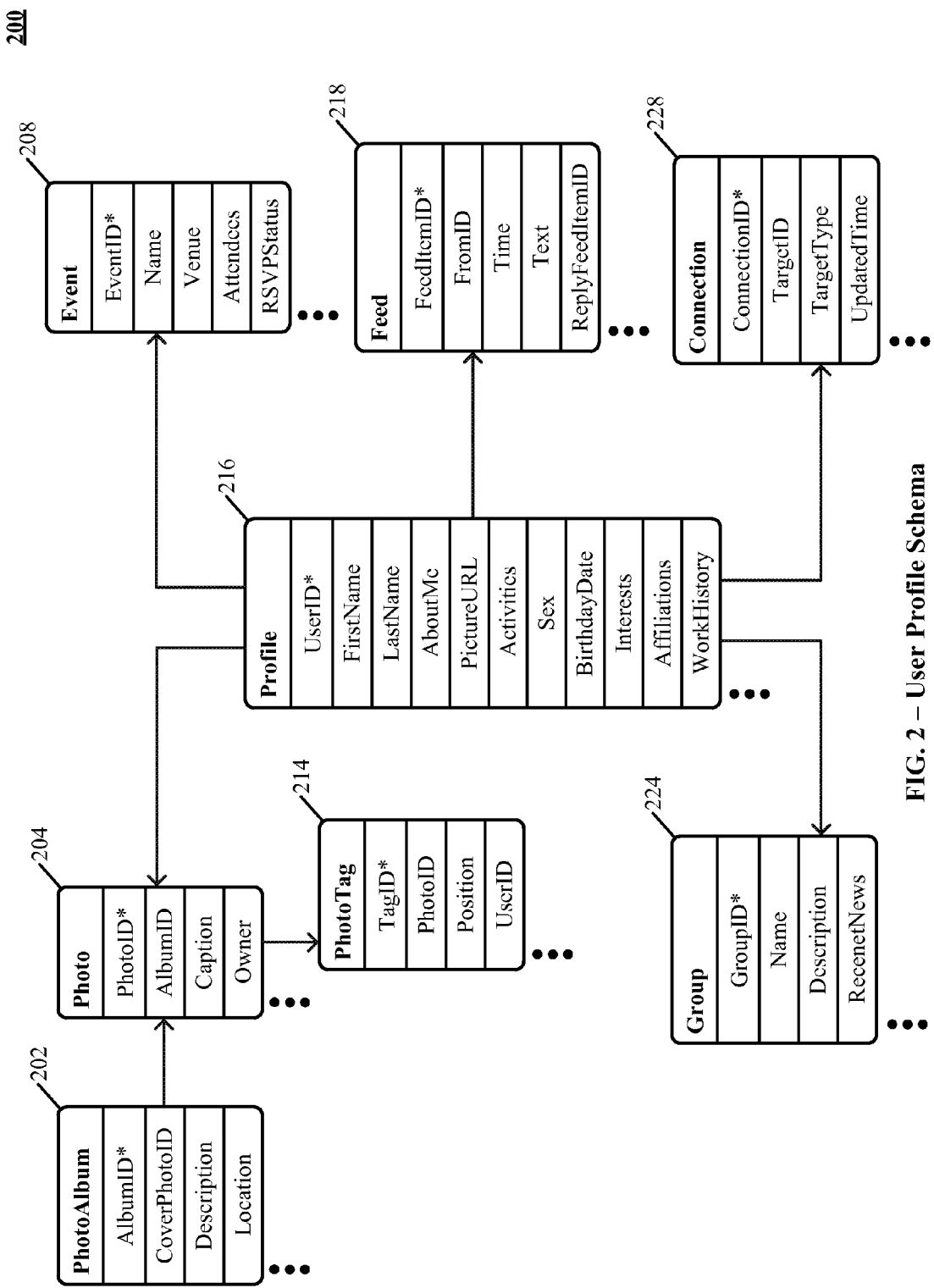
FIG. 2 – User Profile Schema

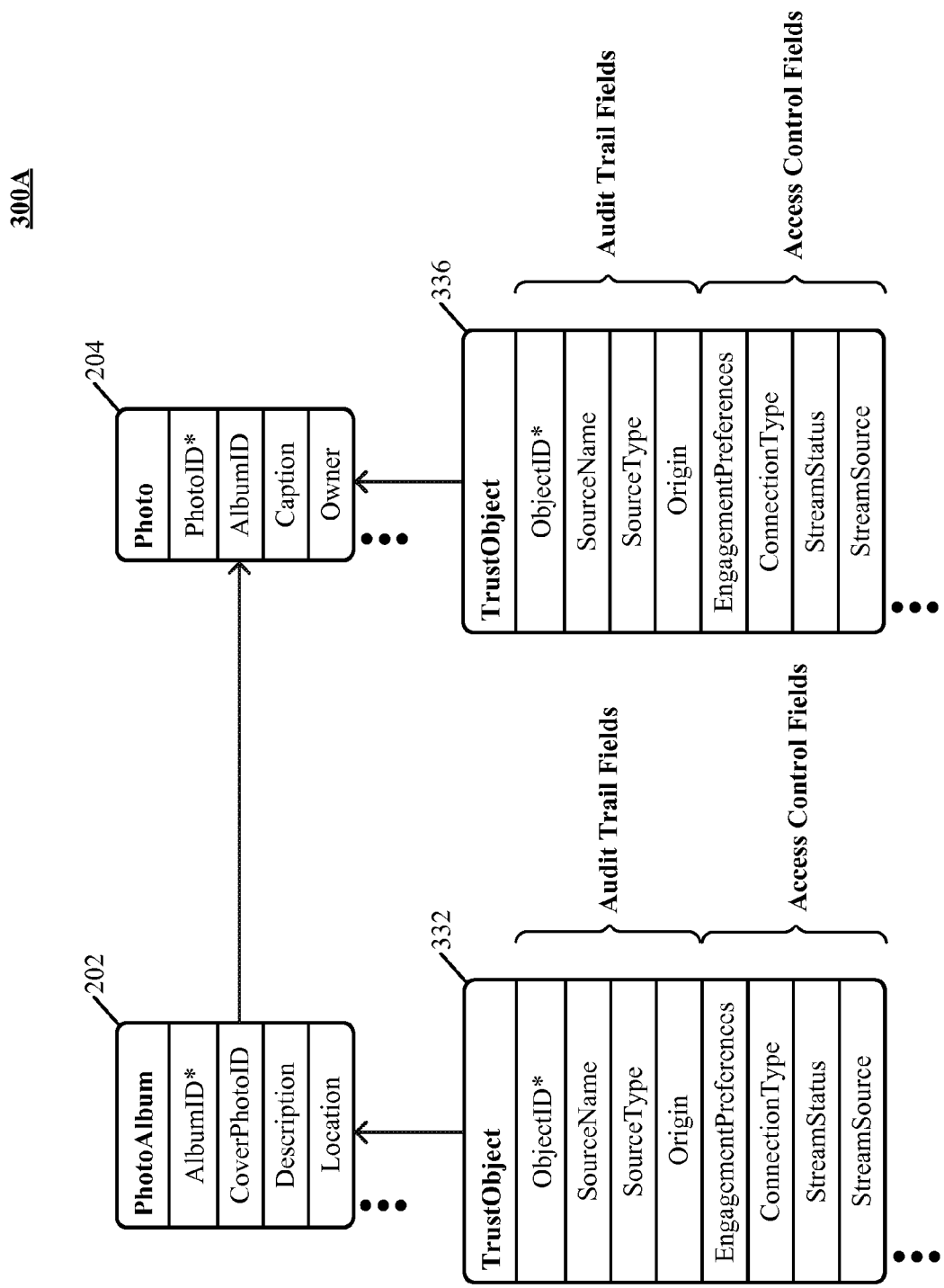
FIG. 3A – Trust Object Schema

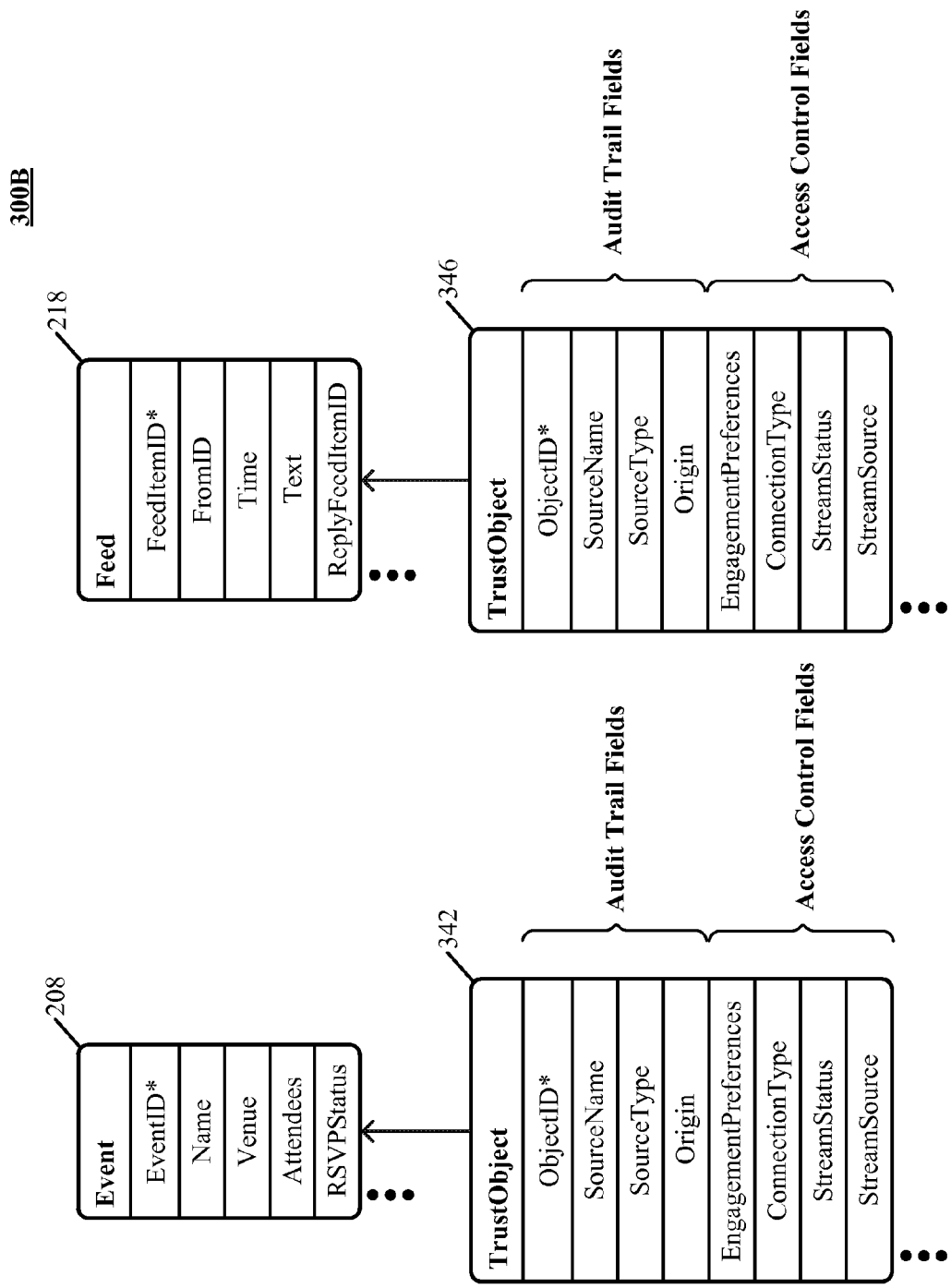
FIG. 3B – Trust Object Schema

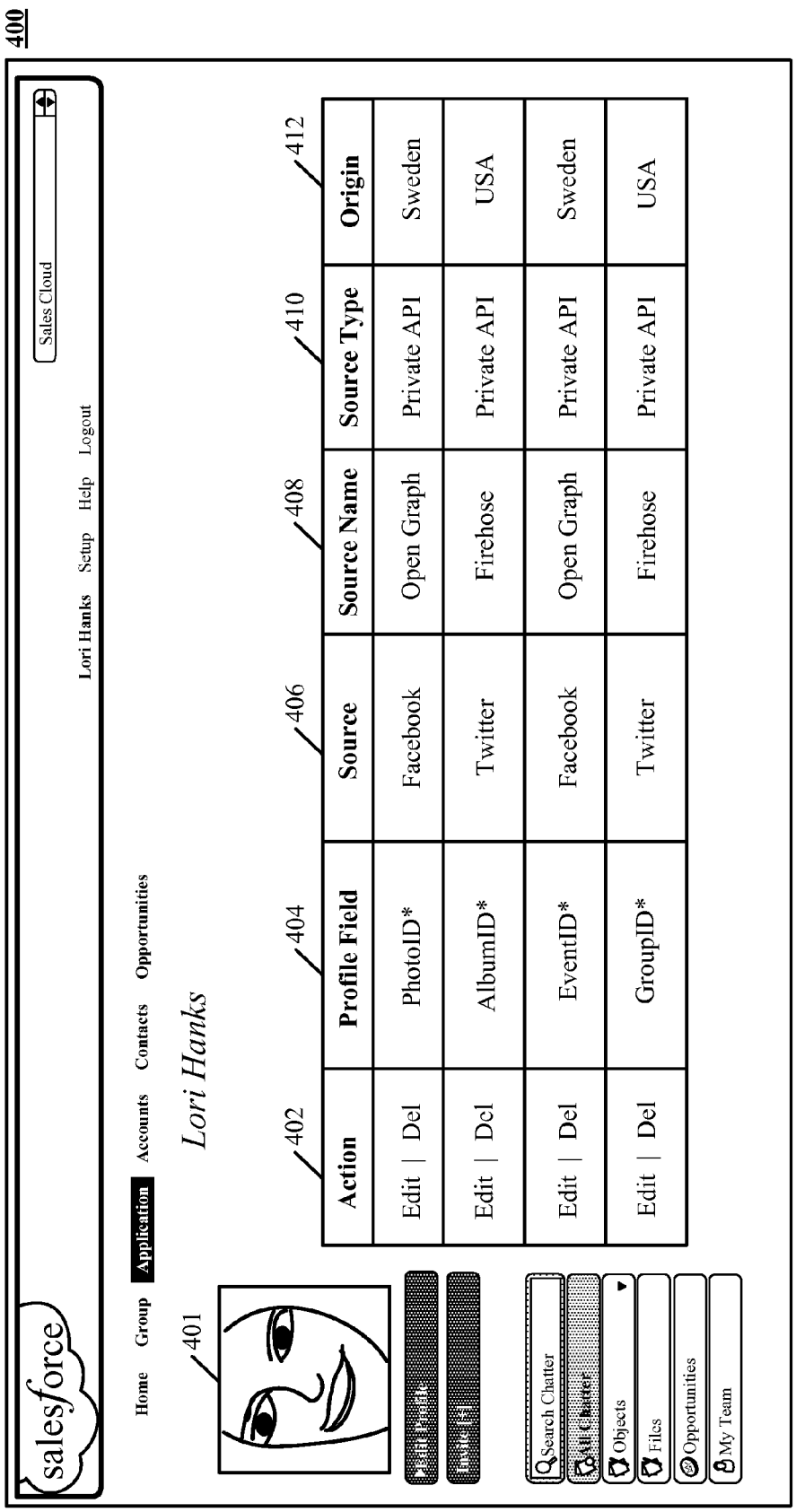
FIG. 4 – Privacy Controller

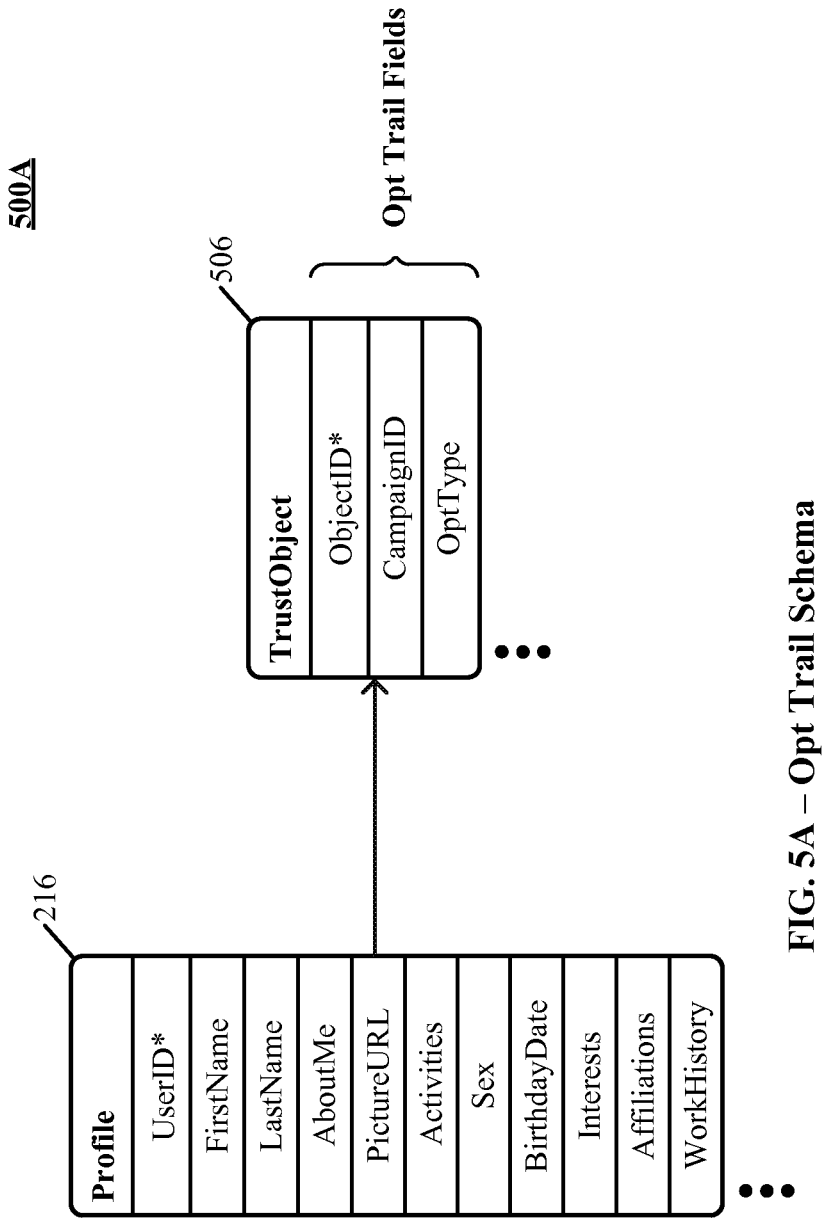
FIG. 5A – Opt Trail Schema

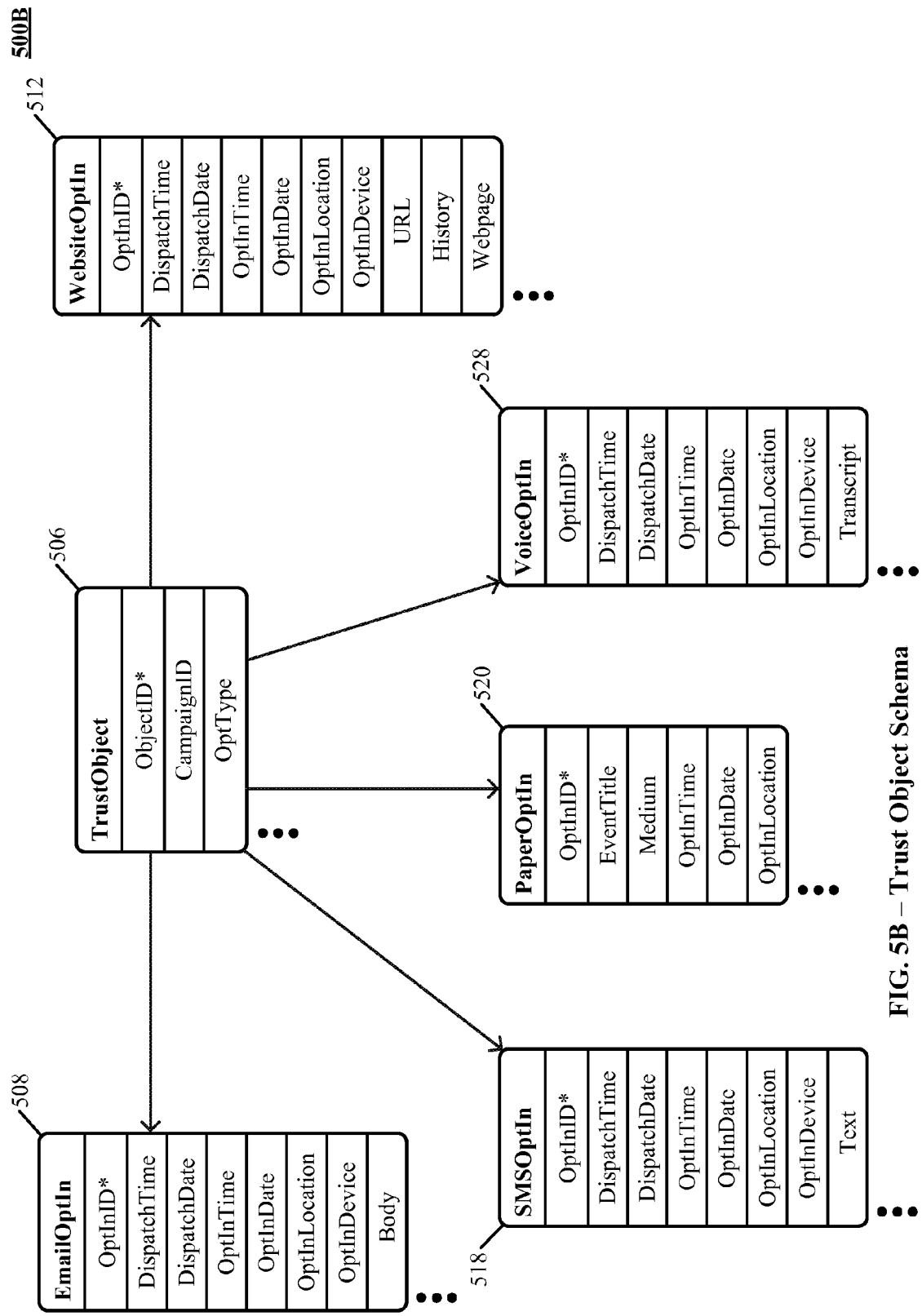
FIG. 5B – Trust Object Schema

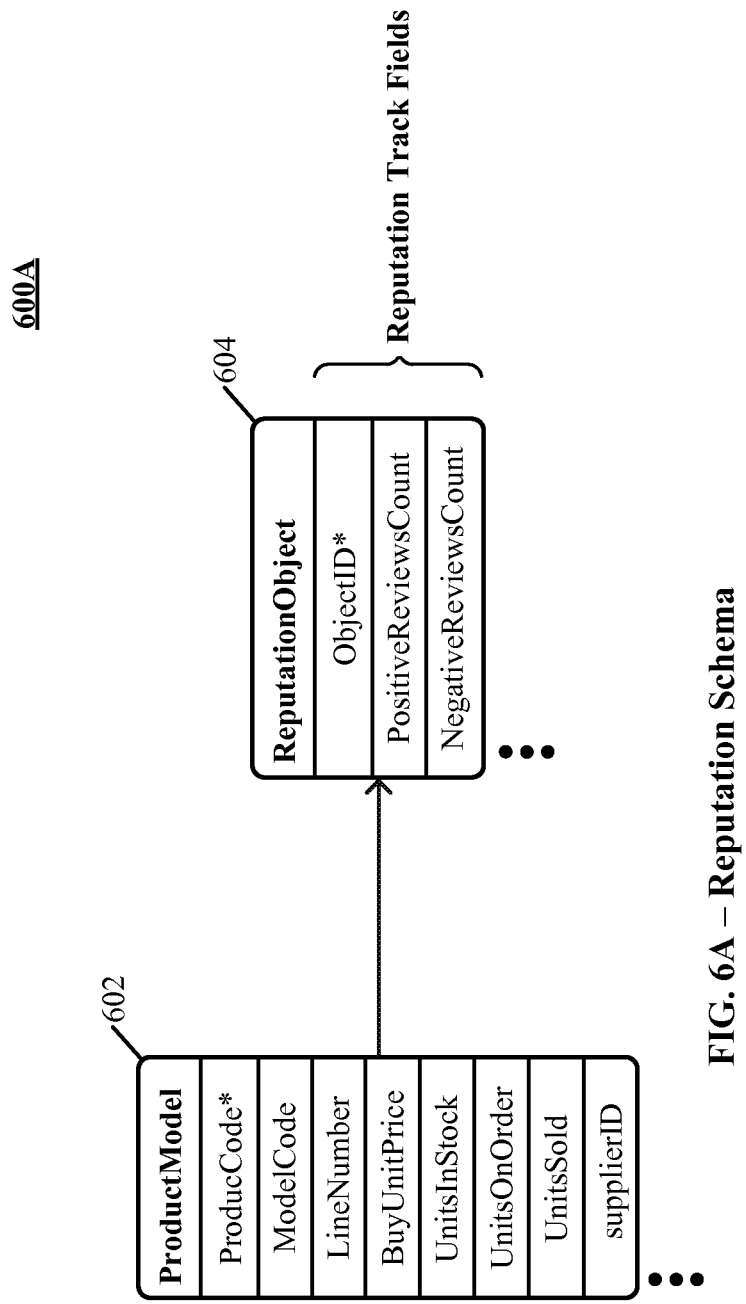
FIG. 6A – Reputation Schema

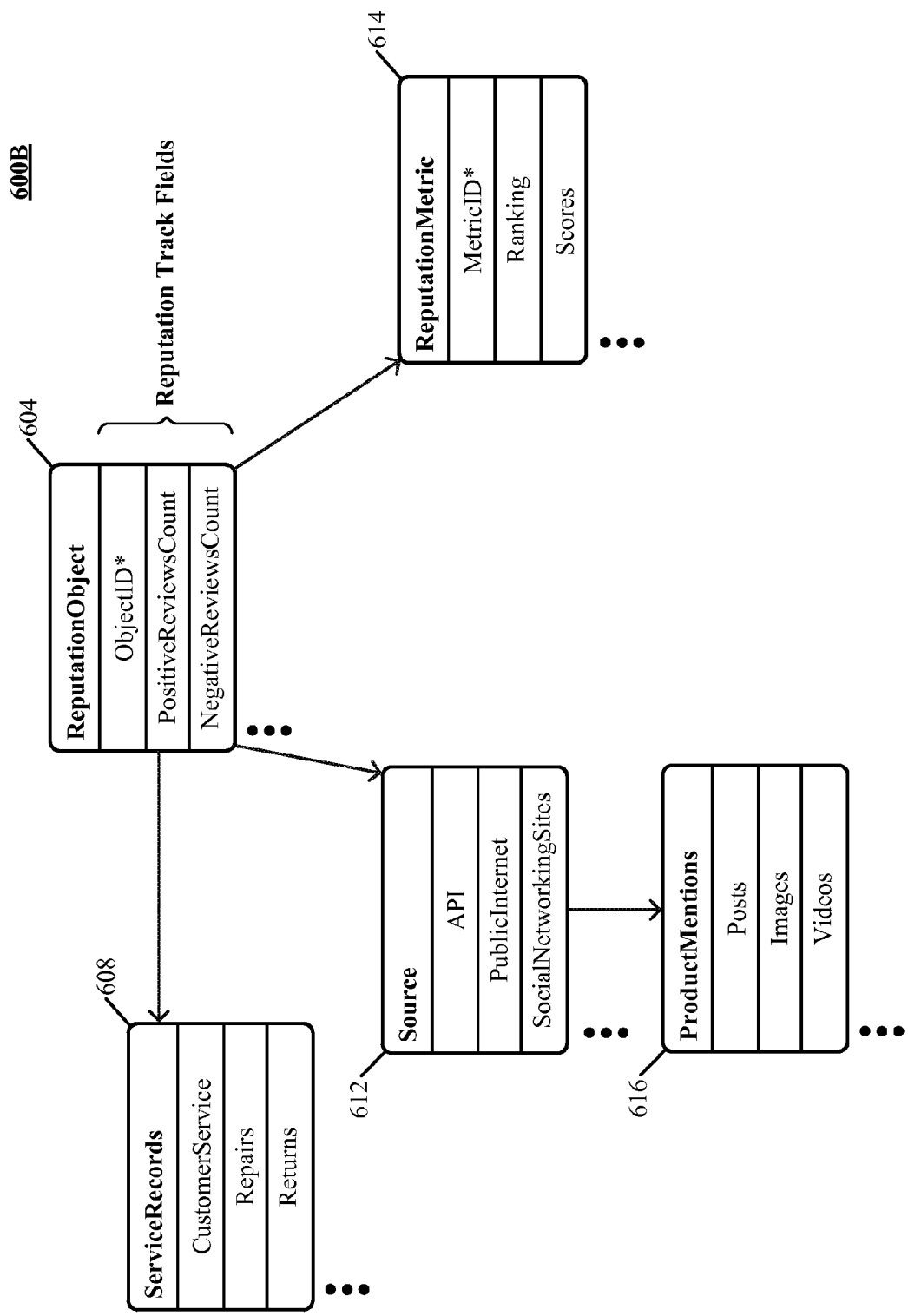
FIG. 6B – Reputation Object Schema

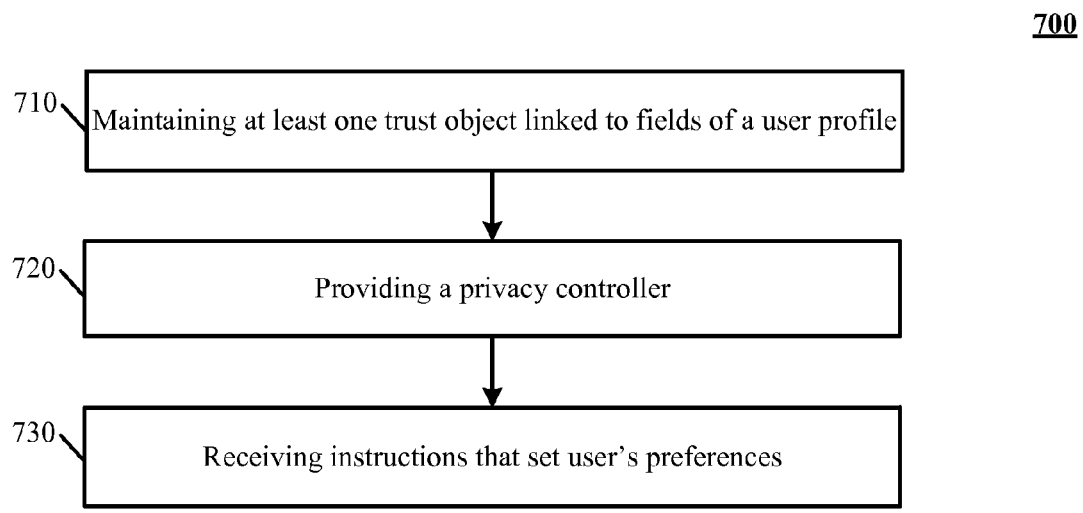
FIG. 7 – Flowchart of Creating an Audit Trail of Data Incorporation

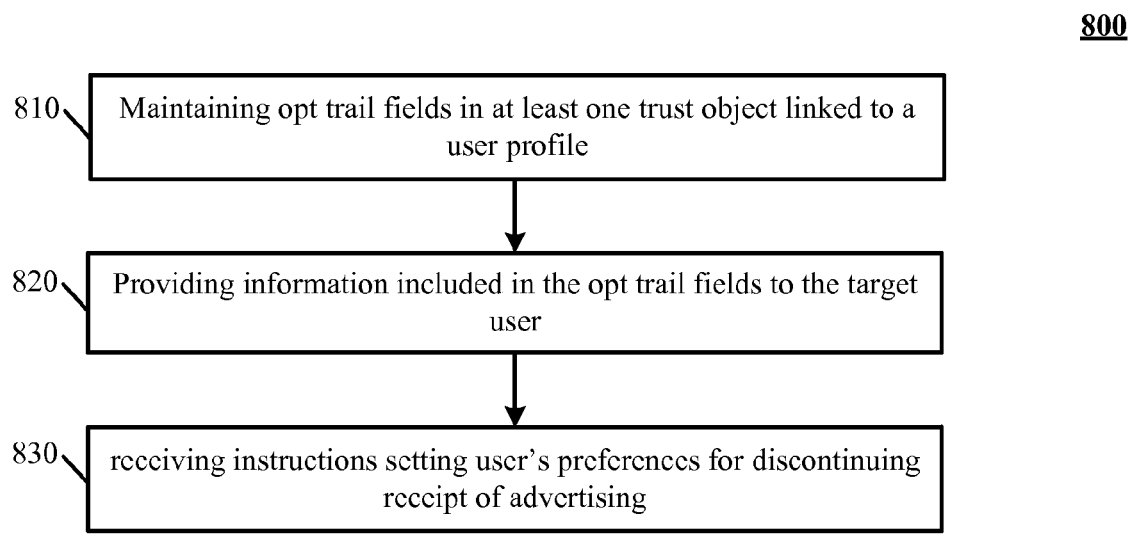
FIG. 8 – Flowchart of Non-Repudiation of User Preferences

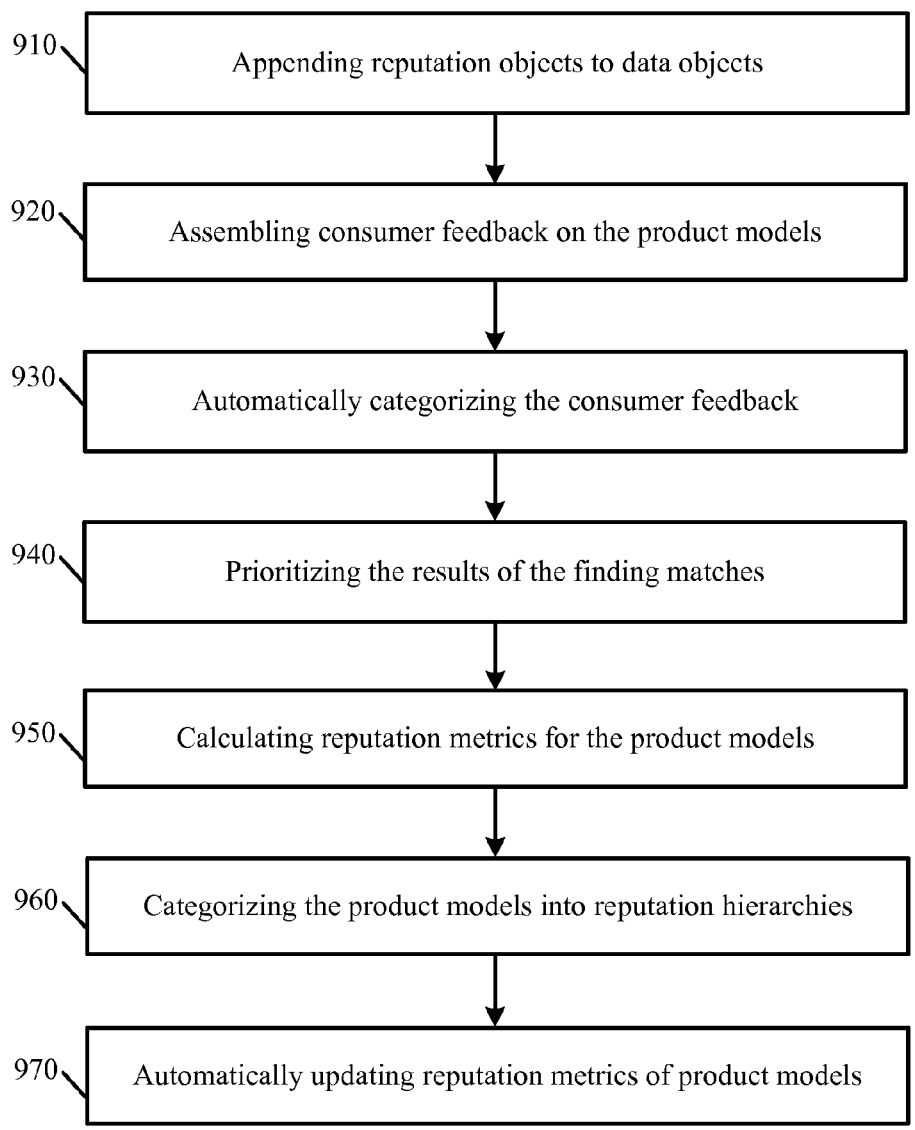
FIG. 9 – Flowchart of Consumer Faced Reputation Tracking of Products

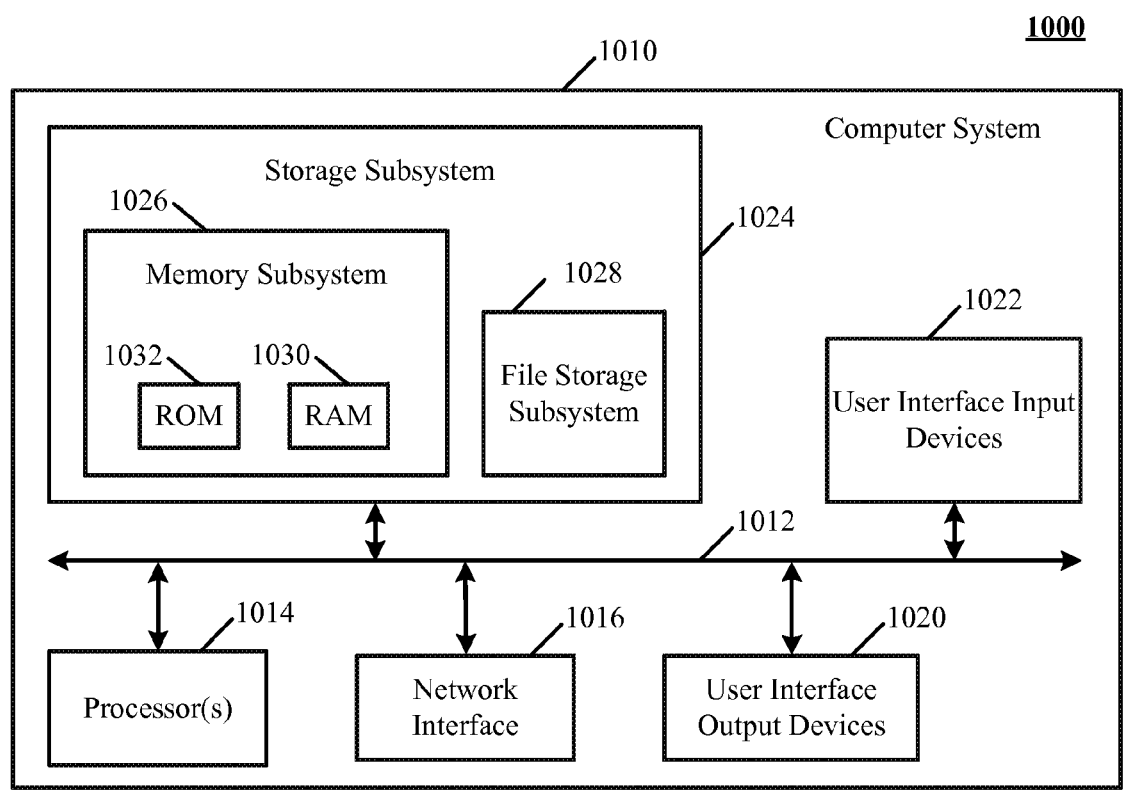
FIG. 10 – Computer System

SYSTEMS AND METHODS OF AUDIT TRAILING OF DATA INCORPORATION

RELATED APPLICATION

This application is related to and continues-in-part U.S. non-provisional Patent application Ser. No. 13/791,295, entitled, "System And Method for Enhancing Trust for Person-Related Data Sources," filed on Mar. 8, 2013, which application claims the benefit of U.S. provisional Patent Application No. 61/608,423, entitled "Social Key Legal and Compliance Layer," filed on Mar. 8, 2012. The related applications are hereby incorporated by reference for all purposes.

This application claims the benefit of U.S. provisional Patent Application No. 61/807,877, entitled, "System and Method for Social Trust Layer Origination Management," filed on Apr. 3, 2013. This application also claims the benefit of U.S. provisional Patent Application No. 61/807,892, entitled, "System and Method for Reputation Object Hierarchy," filed on Apr. 3, 2013. The provisional applications are hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The technology disclosed relates to creating an audit trail of data incorporation in user profiles by linking trust objects to fields of the user profiles. It also relates to maintaining an opt trail that captures user opt-ins by recording the circumstances in which the opt-in actions were performed. It further relates to measuring reputation of product models by assembling consumer feedback from online product reviews and service records of the product models.

The increased use of online social networks has resulted in more and more personal information being shared in the public domain, thus leading to the need to enhance the privacy of users of the online social networks. According to a study published in the June '13 issue of *Computer* magazine "The privacy management of 16 popular social networking sites, including Facebook and Twitter, is seriously deficient." From the applicant's perspective, existing privacy controls offered by the online social networks lack the level traceability and transparency required to concurrently develop more user trust while enhancing user experience.

Another problem, particularly in the e-marketing arena, is that consumers will agree to receive advertising of a campaign, and upon receiving the advertising, will repudiate their consent. Currently, service providers receive millions of requests from users alleging that they did not opt-in to receiving certain content.

Furthermore, companies rely heavily on consumer feedback to develop their marketing, technical, and financial strategies. Since the social media revolution, it has become practical to implement techniques that capture consumer feedback on various online social networks, which can be further used by the companies to improve their products and services.

An opportunity arises to provide users with highly granular privacy controls and present them with information that leads to non-repudiation of their past opt-in actions. An opportunity also arises to make improved business and technology decisions based on feedback directly collected from the consumers. Improved user experience and engagement, higher user satisfaction and retention, and greater sales may result.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows one implementation of servers, clients, and databases used for creating audit trails of data incorporation in a user profile.

FIG. 2 shows one implementation of a schema of a user profile.

FIG. 3A is one implementation of trust object schemas linked to the user profile schema shown in FIG. 2.

FIG. 3B is another implementation of trust object schemas linked to the user profile schema shown in FIG. 2.

FIG. 4 illustrates one implementation of a privacy controller that provides access to trust objects linked to fields of a user profile.

FIG. 5A shows one implementation of an opt trail schema that identifies user engagement preferences.

FIG. 5B is one implementation of a schema of the trust object shown in FIG. 5A.

FIG. 6A shows one implementation of a reputation schema that tracks reputation of product models.

FIG. 6B is one implementation of a schema of the reputation object shown in FIG. 6A.

FIG. 7 illustrates one implementation of a flowchart of creating an audit trail of data incorporation in a user profile.

FIG. 8 is one implementation of a flowchart of non-repudiation of user preferences.

FIG. 9 shows one implementation of a flowchart of consumer faced reputation tracking of products.

FIG. 10 is a block diagram of an example computer system for creating audit trails of data incorporation in a user profile.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to creating audit trails of data incorporation, maintaining an opt trail that captures user opt-ins, and measuring reputation of product models by using computer-implemented systems. The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology may be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

The technology disclosed can be applied to improve privacy management on online social networks. One consumer complaint relates to lack of drill down options that allow granular customization of privacy settings so as to control the information flow into different sections of user profiles. Presently, if consumers want to remove any unwanted data from a particular section of their profiles, they have to completely block the data source from feeding data to any of the sections of the profiles. This restricts their ability to customize their profiles and thus diminishes their user experience.

The technology disclosed records data incorporation events at multiple levels of user profiles—sections, databases, objects, and fields. Over time, collection of such events creates an audit trail that provides consumers with granular information relating to third-party data streaming into their social profiles. This granular information identifies the source, type, and origin of the third-parties. It further includes a privacy controller that provides granular control to the consumers over third-party access to their social profiles. Thus, allowing consumers to customize third-party data streaming on field-by-field basis by opting out of any use of a selected third-party to populate the fields of their social profiles.

Another feature of the technology disclosed is encouraging customers to reaffirm their consent to receive advertising of an advertising campaign, thereby reducing customer repudiation of opt-ins. Customers are constantly bombarded with so many opt-in requests that they usually have minimum or no recollection of their prior consent, even when the opt-in proposal was explicitly presented to them.

The technology disclosed captures the circumstances in which opt-in actions are performed. The circumstantial information is presented to customers to assist their recall of circumstances in which they agreed to receive advertising of an advertising campaign. For instance, if a customer opted in to a campaign while making an online purchase, the technology disclosed can provide the customer with information identifying the online purchase so as to remind him of the chain of events that led to his opt-in. The circumstantial information can include the time, date, location, content, medium and/or device of opt-in.

Online social networks have become the primary platforms where consumers express their opinions about products and services. Information gathered from these platforms is not only reliable but also detailed enough to drive meaningful analytics. The technology disclosed further relates to harnessing the immense amount of information available on the online social networks to gather consumer feedback on product models. It can then apply sentiment analysis on the consumer feedback and separately identify positive and negative feedback. Finally, it can calculate reputation metrics based on the identified positive and negative feedback so as to implement consumer faced reputation tracking of products.

Servers, Clients, and Databases

FIG. 1 shows one implementation of servers, clients, and databases 100 used for creating audit trails of data incorporation in a user profile. FIG. 1 includes trust data store 102, user data store 105, social data store 108, reputation data store 112, service records 118, and network(s) 115. FIG. 1 also shows a privacy controller 122, reputation engine 125, and trust engine 128. In other implementations, servers, clients, and databases 100 may not have the same elements as those listed above and/or may have other/different elements instead of, or in addition to, those listed above. The different elements can be combined into single software modules and multiple software modules can run on the same hardware.

In some implementations, network(s) 115 can be any one or any combination of Local Area Network (LAN), Wide Area Network (WAN), WiFi, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, the engines can be of varying types including workstations, servers, computing clusters, blade servers, server farms, or any other data processing systems or computing devices. The engine can be communicably coupled to the databases via a different network connection. For example, privacy controller 122 can be coupled via the network 115 (e.g., the Internet), reputation engine 125 can be coupled via a direct network link, and trust engine 128 can be coupled by yet a different network connection.

In some implementations, databases can store information from one or more tenants into tables of a common database image to form a multi-tenant database system (MTS). A database image can include one or more database objects. In other implementations, the databases can be relational database management systems (RDBMSs), object oriented database management systems (OODBMSs), distributed file systems (DFS), no-schema database management systems, or any other data storing systems or computing devices.

User data store 105 holds business-to-business contacts that provide business information related to users such as names, addresses, job titles, industry types, territories, market segments, contact information, employer information, etc. In one implementation, user data store 105 can store web or database profiles of the users as a system of interlinked hypertext documents that can be accessed via the network 115 (e.g., the Internet). In another implementation, user data store 105 can also include standard profile information about leads, prospects and/or accounts. This standard profile information can be extracted from company websites, business registration sources such as Jigsaw, Hoovers, or D&B, business intelligence sources, and/or social networking websites like Yelp, Yellow Pages, etc.

Social data store 108 stores social media content assembled from different types of data sources. Social media content can include information about social media sources, social accounts, social personas, social profiles, social handles, social feeds, feed items, content shared, posts, etc.

In one implementation, social media content can add social context to the business-to-business contacts stored in user data store 105. Conversely, business-to-business contacts can add business context to the social personas or profiles according to some other implementations.

Regarding different types of data sources, access controlled application programing interfaces (APIs) like Yahoo Boss, Facebook Open Graph, Twitter Firehose can provide real-time search data aggregated from numerous social media sources such as LinkedIn, Yahoo, Facebook, and Twitter. APIs can initialize sorting, processing and normalization of data. Public internet can provide data from public sources such as first hand websites, blogs, web search aggregators, and social media aggregators. Social networking sites can provide data from social media sources such as Twitter, Facebook, LinkedIn, and Klout.

Trust data engine 128 creates audit trails of data incorporation in user profiles by storing information that uniquely identifies each incorporation event in memory (trust data store 102). In some implementations, trust data engine 128 can create audit trails by linking trust objects to fields of the user profiles. The trust objects hold audit trail fields that include names of data sources, interface categories of the data sources, and/or origins of the data sources. In some implementations, the trust objects also include access control fields that specify field-by-field and party-by-party control over third party access to the fields of the user profiles.

Third parties are data sources that are external to the social networks in which the user profiles are hosted and supply data for incorporation in the user profiles. The access control fields specify users' engagement preferences and connection types with third parties. They also include statuses of data streams from third parties along with information identifying the third parties.

The trust objects also hold information that assists a target user to recall circumstances in which the target user opted into an advertising campaign. In one implementation, the trust objects can include audit trail fields that can capture user opt-ins on various communication channels such as voice, text, or paper.

Privacy controller 132 provides users access to trust objects linked to fields of their user profiles. In one implementation, privacy controller 132 can receive instructions that set user's preferences for field-by-field and party-by-party control over third party access. In another implementation, it can ensure that third parties comply with user's preferences by periodically checking the values in the audit trail fields. In yet another implementation, it can maintain a log of third party access on field-by-field basis.

Reputation engine 122 tracks and measures reputation of product models after sales of products in consumer markets. In one implementation, reputation engine 122 can append reputation objects to data objects that store information related to product lifecycles. In another implementation, it can assemble consumer feedback on the product models by applying sentiment analysis on social feeds (social data store 108) that mention the product models and service records 118 of the product models. It can further calculate reputation metrics for the product models based on the reputation objects, which can be stored in reputation store 112 and presented to product managers.

Reputation engine 122 can further calculate reputation metrics for the product models based on the reputation objects, which can be stored in reputation store 112 and presented to product managers. It can apply various natural language processing algorithms to stratify the consumer feedback as either positive or negative. For instance, it can include generating metadata annotations (e.g., paragraph identification, tokenization, sentence boundary detection, part-of-speech tagging, clause detection, phrase detection (chunking), syntactic analysis, word sense disambiguation, and semantic analysis, etc.) based upon the text of the consumer feedback.

In some implementations, sentiment analysis can include at least identifying occurrences within the one or more product mentions of semantic types corresponding to an expected word and resolving coreference and anaphora within the text of the one or more product mentions. In other implementations, sentiment analysis can also include identifying occurrences of at least one of synonyms, hypernyms, hyponyms, meronyms, and antonyms of the key words within the consumer feedback.

In some implementations, a sentiment resource can include at least one of: a list of positive and negative phrases and relative strengths of the positive and negative phrases; a list of emoticons and relative strengths of the emoticons; a list of shift phrases that strengthen or weaken relative sentiment and indicators of the strengths of the shift phrases; a list of negative indicators; and a list of modal verbs. In other implementations, the sentiment resource list can also include required part-of-speech tags associated with one or more of the list entries. The sentiment analysis can also include negation rules for inverting the sentiment associated with a phrase that are within the scope of predetermined negation elements.

In some implementations, sentiment analysis can include interpreting at least one of modal verbs and imperative statements as indications of negative sentiment. In other implementations, sentiment analysis can be supplemented with audio or video data corresponding to the feedback. The audio or video data can be used to determine sentiment based upon tone of voice or other social cues.

User Profile

FIG. 2 shows one implementation of a schema 200 of a user profile. This and other data structure descriptions that are expressed in terms of objects can also be implemented as tables that store multiple records or object types. Reference to objects is for convenience of explanation and not as a limitation on the data structure implementation. FIG. 2 shows a profile object 216 linked to event object 208, feed object 218, connection object 228, group object 224, and photo object 204. Photo object 204 is further linked to photo album object 202 and photo tag object 214. In other implementations, user profile schema 200 may not have the same objects, tables, fields or entries as those listed above and/or may have other/different objects, tables, fields or entries instead of, or in addition to, those listed above such as a work object, education object, or contact information object.

Profile object 216 provides primary information that identifies a user and includes various fields that store biographic information about a user such as first name, last name, sex, birthday, work history, interests, and the like. The profile object 216 is further linked to other objects that provide supplementary information about the user. For instance, profile object 216 is linked to an event object 208 that stores information related to events subscribed, checked-in, or attended by the user. In one implementation, profile object 216 is linked to a feed object 218 that specifies various feeds items such as posts, comments, replies, mentions, etc. posted by the user or on user's profile.

In another implementation, profile object 216 is linked to a connection object 228 that provides information about other persons in the social network of the user. In one implementation, profile object 216 is linked to a group object 224 that identifies the groups the user is part of In yet another implementation, profile object 216 is linked to a photo object 204 that identifies an image, which is uploaded, posted, or selected by the user. The photo object 204 is further linked to a photo album object 202 that categorizes the image and to a photo tag object 214 that describes the image.

In yet another implementation, schema 200 can have one or more of the following variables with certain attributes: USER_ID being CHAR (15 BYTE), IMAGES_ID being CHAR (15 BYTE), EVENT_ID being CHAR (15 BYTE), GROUP_ID being CHAR (15 BYTE), CONNECTION_ID being CHAR (15 BYTE), FEED_ITEM_ID being CHAR (15 BYTE), CREATED_BY being CHAR (15 BYTE), CREATED_DATE being DATE, and DELETED being CHAR (1 BYTE).

Trust Object

FIG. 3A is one implementation of a trust object schemas 300A linked to the user profile schema 200 shown in FIG. 2. This and other data structure descriptions that are expressed in terms of objects can also be implemented as tables that store multiple records or object types. Reference to objects is for convenience of explanation and not as a limitation on the data structure implementation. FIG. 3A shows trust object 332 linked to photo album object 202. FIG. 3A also shows trust object 336 linked to photo object 204. In other implementations, trust object schemas 300A may not have the same objects, tables, fields or entries as those listed above and/or may have other/different objects, tables, fields or entries instead of, or in addition to, those listed above such as a jurisdiction field, territory field, or industry field.

Trust objects are linked to fields of the user profile schema 200 by trust engine 128 to track data sources that stream content in the fields. As shown in FIG. 3A, trust object 332 is linked to photo album object 202 and its fields and trust object 336 is linked to photo object 204 and its fields. In other implementations, trust engine 128 can link trust objects to other or all the objects or fields of the user profile schema 200. The trust objects can include audit trail fields that identify a trust object by a unique ID referred to as "ObjectID*" along with the name ("SourceName"), type ("SourceType"), and/or origin ("Origin") of a data source that streams data to the objects and fields to which the trust objects are linked.

In another implementation, schema 300A can have one or more of the following variables with certain attributes: USER_ID being CHAR (15 BYTE), SOURCE_ID being CHAR (15 BYTE), OBJECT_ID being CHAR (15 BYTE), FIELD_ID being CHAR (15 BYTE), CREATED_BY being CHAR (15 BYTE), CREATED_DATE being DATE, and DELETED being CHAR (1 BYTE).

"SourceName" field identifies a data source like Yahoo Boss, Instagram, Flickr, or LinkedIn from which the photo album 202 or photo 204 is assembled. "SourceType" refers to a type of a data source such as access controlled application-programming interfaces (APIs), public internet, and/or social networking sites from which data is incorporated into the user profile schema 200. "Origin" field specifies the geographic location of a data source in terms of regions or other geographical classifications such as countries or states. In some implementations, "Origin" field can also identify a jurisdiction applicable to a particular geographic location such as CAN-SPAM regulation applicable to U.S.A.

The trust objects can include access control fields that specify field-by-field and party-by-party control over third party access to the fields of the user profile schema 200. The access control fields can identify engagement preferences ("EngagmentPreferences") and connection type ("ConnectionType") of the user with a third party. They also include statuses of data streams ("StreamStatus") from third parties along with information identifying the third parties ("StreamSource").

"EngagementPreferences" field includes the opt-statuses of the user, specifying whether the user has opted-in or opted-out from engaging with a third-party. "ConnectionType" filed identifies the type of connection a user with a data source such as like, following, connected, not following, not connected, unlike, etc. "StreamStatus" field specifies whether data is currently streamed into the user profile schema 200 from a third-party and "StreamSource" field identifies the third-party from which the data is streamed.

FIG. 3B is one implementation of trust object schemas 300B linked to the user profile schema 200 shown in FIG. 2. This and other data structure descriptions that are expressed in terms of objects can also be implemented as tables that store multiple records or object types. Reference to objects is for convenience of explanation and not as a limitation on the data structure implementation. FIG. 3B shows trust object 342 linked to event object 208. FIG. 3B also shows trust object 346 linked to feed object 218. In other implementations, trust object schemas 300B may not have the same objects, tables, fields or entries as those listed above and/or may have other/different objects, tables, fields or entries instead of, or in addition to, those listed above such as a jurisdiction field, territory field, or industry field.

In another implementation, schema 300B can have one or more of the following variables with certain attributes: USER_ID being CHAR (15 BYTE), SOURCE_ID being CHAR (15 BYTE), OBJECT_ID being CHAR (15 BYTE), FIELD_ID being CHAR (15 BYTE), CREATED_BY being CHAR (15 BYTE), CREATED_DATE being DATE, and DELETED being CHAR (1 BYTE).

In FIG. 3B, trust objects 342 and 346 are respectively linked to event object 208 and feed object 218 of the user profile schema 300. The audit trail fields of trust objects 342 and 346 include fields that described how data was incorporated into the fields of event object 208 and feed object 218. For instance, if the user subscribed to an event on a third party event registration service such as Eventbrite.com, then the audit trail fields can identify the name, type, and/or origin of the event subscription. Similarly, the audit trail fields can specify the content, type, time stamp, date stamp, or location stamp of feed items stored in the feed object 218. Furthermore, the access control fields can enable the user to specify if the fields of the event object 208 and feed object 218 can be updated by a particular third party.

Privacy Controller

FIG. 4 illustrates one implementation of a privacy controller 400 that provides access to trust objects linked to fields of a user profile. In particular, FIG. 4 illustrates an example profile of user 401 named "Lori Hanks" in an online social network such as Salesforce's Chatter that provides a privacy management application. In some implementations, privacy controller 400 can be presented on different online networks such as Klout, Facebook, Twitter, LinkedIn, etc. FIG. 4 shows various screen objects such as action 402, profile filed 404, source 406, source name 406, source type 410, and origin 412. In other implementations, privacy controller 400 may not have the same screen objects, widgets, panes, or tabs as those listed above and/or may have other/different screen objects, widgets, panes, or tabs instead of, or in addition to, those listed above such as.

Privacy controller 400 can take one of a number of forms, including a user interface, dashboard interface, engagement console, and other interface, such as a mobile interface, tablet interface, summary interface, or wearable interface. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, privacy controller 400 can be accessed from a browser running on a computing device. The browser can be Chrome, Internet Explorer, Firefox, Safari, and the like. In other implementations, privacy controller 400 can run as an engagement console on a computer desktop application.

Screen object action 402 provides a user with field-by-field and party-by-party control over third party access to the fields of the user profile schema 200 that are linked to trust objects. Through action 402, the user can escalate ("Edit") a third-party's access to particular fields of the user profile schema 200 or prevent ("Del") a third-party from streaming data to particular fields of the user profile schema 200. Additionally, screen objects profile field 404, source 406, source name 406, source type 410, and origin 412 can present the user with information stored in the audit trail fields.

Opt Trail Schema

FIG. 5A shows one implementation of an opt trail schema 500A that identifies user engagement preferences. This and other data structure descriptions that are expressed in terms of objects can also be implemented as tables that store multiple records or object types. Reference to objects is for convenience of explanation and not as a limitation on the data structure implementation. FIG. 5A shows trust object 506 linked to profile object 216 of user profile schema 200. In other implementations, opt trail schema 500A may not have the same objects, tables, fields or entries as those listed above and/or may have other/different objects, tables, fields or entries instead of, or in addition to, those listed above such as a contest field, solicitation field, or advertisement field.

Trust engine 128 connects a target user to an advertising campaign by linking trust object 506 to the target user's profile object 216. The trust object 506 stores opt trail fields that include information that assists the target user to recall circumstances in which the target user opted into the advertising campaign. In one implementation, the opt trail fields can uniquely specify the trust object 506 with "ObjectID*" field and further identify the advertising campaign with "CampaignID" field. The opt trail fields can also identify the type of opt-in action performed by the user through "Opt-Type" field.

In another implementation, schema 500A can have one or more of the following variables with certain attributes: USER_ID being CHAR (15 BYTE), CAMPAIGN_ID being CHAR (15 BYTE), OBJECT_ID being CHAR (15 BYTE), ACTION_ID being CHAR (15 BYTE), CREATED_BY being CHAR (15 BYTE), CREATED_DATE being DATE, and DELETED being CHAR (1 BYTE).

FIG. 5B is one implementation of a schema 500B of the trust object 506 shown in FIG. 5A. Trust object 506 identifies different types of opt-in actions performed by the user in response to receiving advertising of an advertising campaign. For instance, the trust object 506 can be linked to an email opt-in object 508 that records the user's opting-in to the advertising campaign through an e-mail. As shown in FIG. 5B, the email opt-in object 508 can further include fields that capture the time and date of dispatch of the email soliciting the opt-in; text of email body via which the opt-in was requested; time, date and location of the opt-in action; and information related to the device from which the opt-in action was performed. Similarly, schema 500B can record the user's opt-in to the advertising campaign on other communication channels like voice calls, SMSs, websites, and/or papers along with circumstantial information describing the opt-in such as time, data, location, medium, and device of the opt-in.

In another implementation, schema 500B can have one or more of the following variables with certain attributes: OPT_TYPE_ID being CHAR (15 BYTE), TIME_ID being CHAR (15 BYTE), DATE_ID being CHAR (15 BYTE), LOCATION_ID being CHAR (15 BYTE), BODY_ID being CHAR (15 BYTE), DEVICE_ID being CHAR (15 BYTE), OBJECT_ID being CHAR (15 BYTE), FIELD_ID being CHAR (15 BYTE), CREATED_BY being CHAR (15 BYTE), CREATED_DATE being DATE, and DELETED being CHAR (1 BYTE).

Reputation Object

FIG. 6A shows one implementation of a reputation schema 600A that tracks reputation of product models. This and other data structure descriptions that are expressed in terms of objects can also be implemented as tables that store multiple records or object types. Reference to objects is for convenience of explanation and not as a limitation on the data structure implementation. FIG. 6A shows reputation object 604 linked to product model object 602. In other implementations, reputation schema 600A may not have the same objects, tables, fields or entries as those listed above and/or may have other/different objects, tables, fields or entries instead of, or in addition to, those listed above such as a score field, like field, or rating field.

Reputation engine 122 measures reputation of product models by appending reputation object 604 to a product model object 602 that tracks a product model after sales of associated products in consumer markets. In one implementation, reputation object 604 holds reputation track fields that can uniquely identify the reputation object 604 with "ObjectID*" field and further specify a count of the positive reviews ("PositiveReviewsCount") and negative reviews ("NegativeReviewsCount") about the product model.

In another implementation, schema 600A can have one or more of the following variables with certain attributes: MODEL_ID being CHAR (15 BYTE), POSITIVE_REVIEW_ID being CHAR (15 BYTE), NEGATIVE_REVIEW_ID being CHAR (15 BYTE), OBJECT_ID being CHAR (15 BYTE), FIELD_ID being CHAR (15 BYTE), CREATED_BY being CHAR (15 BYTE), CREATED_DATE being DATE, and DELETED being CHAR (1 BYTE).

FIG. 6B is one implementation of a schema 600B of the reputation object 604 shown in FIG. 6A. This and other data structure descriptions that are expressed in terms of objects can also be implemented as tables that store multiple records or object types. Reference to objects is for convenience of explanation and not as a limitation on the data structure implementation. FIG. 6B shows reputation object 604 linked to service records object 608, reputation metric 614, and source 612. FIG. 6B also shows source object 612 linked to product mentions object 616 and language object 618. In other implementations, schema 600B may not have the same objects, tables, fields or entries as those listed above and/or may have other/different objects, tables, fields or entries instead of, or in addition to, those listed above such as a sentiment object, volume object, or region object.

In another implementation, schema 600B can have one or more of the following variables with certain attributes: MODEL_ID being CHAR (15 BYTE), FAMILY_ID being CHAR (15 BYTE), LOT_ID being CHAR (15 BYTE), METRIC_ID being CHAR (15 BYTE), HIERACRCHY_ID being CHAR (15 BYTE), OBJECT_ID being CHAR (15 BYTE), FIELD_ID being CHAR (15 BYTE), CREATED_BY being CHAR (15 BYTE), CREATED_DATE being DATE, and DELETED being CHAR (1 BYTE).

Reputation engine 122 can collect consumer feedback on product model 602 from various data sources 612 by assembling user generated content or crowd sourced reviews (social feeds, web mentions) that mention 616 the product model along with service records 608 of the product. Reputation engine 122 can further calculate a reputation metric 614 for the product model 602 based on the number, type, and/or content of the positive and negative reviews.

Flowchart of Creating an Audit Trail of Data Incorporation

FIG. 7 illustrates one implementation of a flowchart 700 of creating an audit trail of data incorporation in a user profile. Flowchart 700 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 7. Multiple actions can be combined in some implementations. For convenience, this flowchart is described with reference to the system that carries out a method. The system is not necessarily part of the method.

At action 710, trust engine 118 maintains at least one trust object linked to fields of a user profile. The trust object holds audit trail fields that identify how data became incorporated in at least some fields of the user profile and access control fields that specify field-by-field and party-by-party control over third party access to the fields of the user profile. The audit trail fields include names of data sources, interface categories of the data sources, origins of the data sources, and a user's engagement preferences applicable to a particular data field of the user profile. The interface categories of the data sources include access controlled APIs, public Internet and social networking sites. The origins of the data sources identify geographic locations of the data sources. The user's engagement preferences applicable to a particular data field of the user profile specify whether the user has opted-in or opted-out of any use of a data source to populate the fields of the user profile.

At action 720, a privacy controller is provided that provides user access to information in the audit trail fields and also provides user control on a field-by-field and party-by-party basis over third party access to the fields of the user profile linked to the trust object. In one implementation, the privacy controller enables the user to opt out of any use of a selected data source to populate the fields of the user profile.

At action 730, instructions that set user's preferences for field-by-field and party-by-party control over the third party access are received and the trust object is updated responsive to the instructions. For instance, if the user chooses to hide content sourced in a particular user profile field by a particular data source, the trust engine 118 can update the access control fields to block stream of data by that particular data source in the particular user profile field.

Flowchart of Non-Repudiation of User Preferences

FIG. 8 is one implementation of a flowchart 800 of non-repudiation of user preferences. Flowchart 800 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 8. Multiple actions can be combined in some implementations. For convenience, this flowchart is described with reference to the system that carries out a method. The system is not necessarily part of the method.

At action 810, trust engine 118 maintains opt trail fields in at one trust object linked to a user profile. The opt trail fields include information that assists the target user to recall circumstances in which the target user opted into the advertising campaign.

For voice opt-in, the opt trail fields include time and date of dispatch of call soliciting the voice opt-in, time, date and location of an opt-in action and information related to device from which the opt-in action took place. For voice opt-in, the opt trail fields further include transcript of conversation via which the voice opt-in was presented.

For SMS opt-in, the opt trail fields include time and date of dispatch of SMS soliciting the SMS opt-in, text of message body via which the SMS opt-in was presented, time, date and location of an opt-in action, and information related to device from which the opt-in action took place.

For email opt-in, the opt trail fields include time and date of dispatch of email soliciting the email opt-in, text of email body via which the email opt-in was presented, time, date and location of an opt-in action, and information related to device from which the opt-in action took place.

For website opt-in, the opt trail fields include unified resource locator of website on which the website opt-in occurred, history of target user's activity on the website on which the website opt-in occurred, copy of webpage via which the website opt-in was presented, time, date and location of an opt-in action, and information related to device from which the opt-in action took place.

For paper opt-in, the opt trail fields include information that identifies an event at which the paper opt-in occurred, particular medium via which the paper opt-in was presented, and time, date and location of an opt-in action.

At action 820, the information included in the opt trail fields is provided to the target across. In one implementation, this information can be provided to the target user across a user interface upon receiving non-repudiation requests. In another implementation, this information can be automatically forwarded to the target user immediately after an opt-in.

At action 830, instructions setting user's preferences for discontinuing receipt of advertising are received. In one implementation, the opt trail fields can be automatically updated to capture target user's opt-out and forwarded to organizers of the advertising campaign so as to prevent future attempts to engage with the target user.

Flowchart of Consumer Faced Reputation Tracking of Products

FIG. 9 shows one implementation of a flowchart 900 of consumer faced reputation tracking of products. Flowchart 900 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 9. Multiple actions can be combined in some implementations. For convenience, this flowchart is described with reference to the system that carries out a method. The system is not necessarily part of the method.

At action 910, reputation engine 122 appends reputation objects to data objects that track product models after sales of products in consumer markets. The reputation objects can include reputation track fields that identify the number, type and content of consumer feedback on the product models.

At action 920, reputation engine 122 assembles consumer feedback on the product models. It can achieve this by crawling different data sources including APIs, public Internet, and social networking sites and collecting online posts (feed items, web mentions) that mention the product models. It can also spider service records related to the product models to gather customer reviews. In one implementation, reputation engine 122 can issue a query on different data sources that specifies different ways the product models are spelled or referred to by consumers.

At action 930, reputation engine 122 automatically categorizes the received results or consumer feedback as being positive or negative by applying sentiment analysis that identifies the tones and sentiments of consumers. For instance, reputation engine 122 can use keywords such as "bad service", "not working", "hung up", etc. to identify negative reviews. Similarly, it can find positive reviews on the product models by identifying textual appreciative content like "love", "great", "awesome", or "recommend" and non-textual appreciative content such as emoticons, likes, stars, thumbs up, bonuses, ratings, badges, or ratings. In other implementations, it can categorize the consumer feedback based on ratings or scores.

At action 940, the fields of the reputation objects are updated to include the categorized consumer feedback. The positive and negative feedbacks can be separately stored for further processing by the reputation engine 122.

At action 950, reputation engine 122 calculates reputation metrics for the product models based on the number, type, and content of the positive and negative feedbacks. In one implementation, if the total number of the negative feedbacks is greater than the total number of positive feedback, then a particular product model can be identified as one that requires further attention in terms of its operability, bugs, or marketing. Furthermore, some type of feedbacks can be given more weight than others. For example, a video criticizing a product model may be given more weight than a post doing the same and thus the product model can be allocated more negative points in the reputation metric. Also, a lengthy and elaborate consumer feedback can be given more value or points as compared to a short and lukewarm feedback.

At action 960, the reputation engine 122 categorizes the product models into reputation hierarchies based on the reputation metrics. The reputation hierarchies stratify the products models into product families and product lots. In one implementation, the product models that were released earlier or on which great resources were spent can be higher in the hierarchy. In another implementation, the product models that have higher reputation can be placed higher.

For example, HP1234 model printers with 1492 serial number can have parent reputation levels while they were sitting in a retail store. Once they are sold, they can be moved from the "sales" step in the lifecycle to the "service" step. If the product fails, it can receive negative reputation points. If consumers "like" the product, it can receive positive reputation points. This individual reputation could trickle up the hierarchy and influence the HP1234 line reputation, and even further the HP Printer line or HP as a whole, in some implementations. The top parent can inherit the sum of all children in the hierarchy, which can be potentially weighted according to pre-defined criteria.

At action 970, the reputation engine 122 automatically updates reputation metrics of product models in a reputation hierarchy responsive to changes in reputation metrics of other product models in the reputation hierarchy. For instance, if the reputation of Salesforce's "Jigsaw" product model increases, then the reputation of Salesforce's "Data.com" product, of which "Jigsaw" is part, can be automatically increased.

Computer System

FIG. 10 is a block diagram of an example computer system 1000 for creating audit trails of data incorporation in a user profile. FIG. 10 is a block diagram of an example computer system, according to one implementation. Computer system 1010 typically includes at least one processor 1014 that communicates with a number of peripheral devices via bus subsystem 1012. These peripheral devices can include a storage subsystem 1024 including, for example, memory devices and a file storage subsystem, user interface input devices 1022, user interface output devices 1020, and a network interface subsystem 1016. The input and output devices allow user interaction with computer system 1010. Network interface subsystem 1016 provides an interface to outside networks, including an interface to corresponding interface devices in other computer systems.

User interface input devices 1022 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1020 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules and methods described herein. These software modules are generally executed by processor 1014 alone or in combination with other processors.

Memory subsystem 1026 used in the storage subsystem can include a number of memories including a main random access memory (RAM) 1030 for storage of instructions and data during program execution and a read only memory (ROM) 1032 in which fixed instructions are stored. A file storage subsystem 1028 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1028 in the storage subsystem 1024, or in other machines accessible by the processor.

Bus subsystem 1012 provides a mechanism for letting the various components and subsystems of computer system 1010 communicate with each other as intended. Although bus subsystem 1012 is shown schematically as a single bus, alternative implementations of the bus subsystem can use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as one example. Many other configurations of computer system 1010 are possible having more or fewer components than the computer system depicted in FIG. 10.

Particular Implementations

In one implementation, a method is described from the perspective of a server receiving messages from a user software. The method includes maintaining at least one trust object linked to fields of a user profile. The trust object holds audit trail fields that identify how data became incorporated in at least some fields of the user profile and access control fields that specify field-by-field and party-by-party control over third party access to the fields of the user profile. It also includes providing a privacy controller that providing user access to information in the audit trail fields for the user's own user profile and also provides user control on a field-by-field and party-by-party basis over third party access to the fields of the user profile linked to the trust object. It further includes receiving instructions that set user's preferences for field-by-field and party-by-party control over the third party access to the user's own user profile and updating the trust object responsive to the instructions.

This and other method described can be presented from the perspective of a mobile device and user software interacting with a server. From the mobile device perspective, the method maintains at least one trust object linked to fields of a user profile, relying on the server to configure trust object that holds audit trail fields, which identify how data became incorporated in at least some fields of the user profile and access control fields, which specify field-by-field and party-by-party control over third party access to the fields of the user profile. In some implementations, the mobile device provides an interface that displays a privacy controller, which provides user access to information in the audit trail fields and also provides user control on a field-by-field and party-by-party basis over third party access to the fields of the user profile linked to the trust object. The mobile device further receives instructions that set user's preferences for field-by-field and party-by-party control over the third party access and updating the trust object responsive to the instructions.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as trust object, opt trail schema, privacy controller, reputation object, etc.

The method further includes the privacy controller enabling the user to opt out of any use of a selected data source to populate the fields of the user profile. The audit trail fields include names of data sources, interface categories of the data sources, origins of the data sources, and a user's engagement preferences applicable to a particular data field of the user profile. The interface categories of the data sources include access controlled APIs, public Internet and social networking sites. The origins of the data sources identify geographic locations of the data sources. The user's engagement preferences applicable to a particular data field of the user profile specify whether the user has opted-in or opted-out of any use of a data source to populate the fields of the user profile.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described from the perspective of a server receiving messages from a user software. The method includes maintaining opt trail fields in at least one trust object linked to a user profile that connects a target user to an advertising campaign. The opt trail fields include information that assists the target user to recall circumstances in which the target user opted into the advertising campaign. It also includes providing information included in the opt trail fields to the target user. It further includes receiving instructions setting target user's preferences to continue or discontinue receipt of advertising of the advertising campaign.

This method and other implementations of the technology disclosed can include one or more of the following features and/or features described in connection with additional methods disclosed.

For voice opt-in, the opt trail fields include time and date of dispatch of call soliciting the voice opt-in, time, date and location of an opt-in action and information related to device from which the opt-in action took place. For voice opt-in, the opt trail fields further include transcript of conversation via which the voice opt-in was presented.

For SMS opt-in, the opt trail fields include time and date of dispatch of SMS soliciting the SMS opt-in, text of message body via which the SMS opt-in was presented, time, date and location of an opt-in action, and information related to device from which the opt-in action took place.

For email opt-in, the opt trail fields include time and date of dispatch of email soliciting the email opt-in, text of email body via which the email opt-in was presented, time, date and location of an opt-in action, and information related to device from which the opt-in action took place.

For website opt-in, the opt trail fields include unified resource locator of website on which the website opt-in occurred, history of target user's activity on the website on which the website opt-in occurred, copy of webpage via which the website opt-in was presented, time, date and location of an opt-in action, and information related to device from which the opt-in action took place.

For paper opt-in, the opt trail fields include information that identifies an event at which the paper opt-in occurred, particular medium via which the paper opt-in was presented, and time, date and location of an opt-in action.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described from the perspective of a server receiving messages from a user software. The method includes appending reputation objects to data objects that track product models after sales of products in consumer markets. It includes assembling consumer feedback on the product models, including receiving user generated content from online social networks that mentions the product models and receiving service records of the product models. It also includes automatically categorizing the consumer feedback based on sentiment analysis and updating fields of the reputation objects based on the consumer feedback on the product models. It further includes calculating reputation metrics for the product models based on the reputation objects.

This method and other implementations of the technology disclosed can include one or more of the following features and/or features described in connection with additional methods disclosed.

The method includes categorizing the product models into reputation hierarchies based on the reputation metrics, wherein the hierarchies stratify the products models into product families and product lots. It also includes automatically updating reputation metrics of products models in a reputation hierarchy responsive to changes in reputation metrics of other products models in the reputation hierarchy.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A method preventing incorporation of data entries by a third party to a user's own user profile, including:
   maintaining at least one trust object linked to fields of a user profile on an online social network, wherein the trust object holds
      audit trail fields that identify how data became incorporated in at least some fields of the user profile including names of data sources, interface categories of the data sources, and origins that identify geographic locations of the data sources; and
      access control fields that specify field-by-field and party-by-party control over third party data incorporation to the user profile fields including identifying a user's engagement preferences, a connection type of the user with a third party, statuses of data streams from third parties and information identifying the third parties;
   providing a privacy controller, wherein the privacy controller
      provides user access to information in the audit trail fields for user's own user profile; and
      provides user control on a field-by-field and party-by-party basis over third party data incorporation to the user profile fields;
   receiving instructions that set user's preferences for field-by-field and party-by-party control over the third party data incorporation to the user's own user profile; and
   updating the trust object responsive to the received instructions and using the updated trust object to automatically prevent incorporation of data entries by a third party to the user's own user profile of the online social network according to one or more of a source, a type, and an origin of the third party identified from the information.

2. The method of claim 1, wherein the privacy controller enables the user to opt out of any use of a selected data source to populate the fields of the user profile.

3. The method of claim 1, wherein the interface categories of the data sources include access controlled APIs, public Internet and social networking sites.

4. The method of claim 1, wherein the user's engagement preferences applicable to a particular data field of the user profile specify whether the user has opted-in or opted-out of any use of a data source to populate the fields of the user profile.

5. The method of claim 1, further including reaffirming that the user has consented to receive content from a third party, thereby reducing customer repudiation of opt-ins.

6. The method of claim 1, further including providing drill down options that allow granular customization of privacy settings so as to control the information flow into different sections of a user's own user profile.

7. A non-transitory computer-readable storage medium storing instructions for preventing incorporation of data entries by a third party to a user's own user profile, which when executed by a processor, cause the processor to:
   create at least one trust object linked to fields of a user profile on an online social network, wherein the trust object holds:
      audit trail fields that identify how data became incorporated in at least some fields of the user profile including names of data sources, interface categories of the data sources, and origins that identify geographic locations of the data sources; and
      access control fields that specify field-by-field and party-by-party control over third party data incorporation to the user profile fields including identifying a user's engagement preferences, a connection type of the user with a third party, statuses of data streams from third parties and information identifying the third parties;
   provide user access to information in the audit trail fields for user's own user profile;
   provides user control on a field-by-field and party-by-party basis over third party data incorporation to the user profile fields;
   receive instructions that set user's preferences for field-by-field and party-by-party control over the third party data incorporation to the user's own user profile; and
   update the trust object responsive to the instructions and use the updated trust object to automatically prevent incorporation of data entries by a third party to the user's own user profile of the online social network according to one or more of a source, a type, and an origin of the third party identified from the information.

8. The non-transitory computer-readable storage medium of claim 7, further storing instructions, which when executed by a processor, cause the processor to enable the user to opt out of any use of a selected data source to populate the fields of the user profile.

9. The non-transitory computer-readable storage medium of claim 7, wherein the interface categories of the data sources include access controlled APIs, public Internet and social networking sites.

10. The non-transitory computer-readable storage medium of claim 7, wherein the user's engagement preferences applicable to a particular data field of the user profile specify whether the user has opted-in or opted-out of any use of a data source to populate the fields of the user profile.

11. A system comprising a processor coupled to a non-transitory computer-readable storage medium storing instructions for preventing incorporation of data entries by a third party to a user's own user profile, which when executed by a processor, cause the processor to:
  create at least one trust object linked to fields of a user profile on an online social network, wherein the trust object holds:
    audit trail fields that identify how data became incorporated in at least some fields of the user profile including names of data sources, interface categories of the data sources, and origins that identify geographic locations of the data sources; and
    access control fields that specify field-by-field and party-by-party control over third party data incorporation to the user profile fields including identifying a user's engagement preferences, a connection type of the user with a third party, statuses of data streams from third parties and information identifying the third parties;
  provide user access to information in the audit trail fields for user's own user profile;
  provides user control on a field-by-field and party-by-party basis over third party data incorporation to the user profile fields;
  receive instructions that set user's preferences for field-by-field and party-by-party control over the third party data incorporation to the user's own user profile; and
  update the trust object responsive to the instructions and use the updated trust object to automatically prevent incorporation of data entries by a third party to the user's own user profile of the online social network according to one or more of a source, a type, and an origin of the third party identified from the information.

12. The system of claim 11, wherein the non-transitory computer-readable storage medium further stores instructions, which when executed by the processor, cause the processor to enable the user to opt out of any use of a selected data source to populate the fields of the user profile.

13. The system of claim 11, wherein the interface categories of the data sources include access controlled APIs, public Internet and social networking sites.

14. The system of claim 11, wherein the user's engagement preferences applicable to a particular data field of the user profile specify whether the user has opted-in or opted-out of any use of a data source to populate the fields of the user profile.

* * * * *